(12) United States Patent
Miller et al.

(10) Patent No.: US 7,392,098 B2
(45) Date of Patent: Jun. 24, 2008

(54) CONTROL SYSTEM

(75) Inventors: Peter John Miller, Shefford (GB); Andrew Charles Osborne Smith, Coventry (GB); Michael John Lindsey, Wimborne (GB); Robert John Barnes, Cannock (GB); David John Allen, Bedford (GB); Graham Ludar-Smith, Penrith (GB)

(73) Assignee: Ricardo UK Limited, West Sussex (GB)

( * ) Notice: Subject to any disclaimer, the term of this patent is extended or adjusted under 35 U.S.C. 154(b) by 0 days.

(21) Appl. No.: 10/522,008

(22) PCT Filed: Jul. 18, 2003

(86) PCT No.: PCT/GB03/03102

§ 371 (c)(1),
(2), (4) Date: Nov. 23, 2005

(87) PCT Pub. No.: WO2004/010235

PCT Pub. Date: Jan. 29, 2004

(65) Prior Publication Data

US 2006/0122713 A1    Jun. 8, 2006

(30) Foreign Application Priority Data

Jul. 18, 2002   (GB)   ................... 0216740.1

(51) Int. Cl.
*G05B 11/01*   (2006.01)
(52) U.S. Cl. ............................................ 700/21
(58) Field of Classification Search ............ 700/21; 73/118.1; 701/3
See application file for complete search history.

(56) References Cited

U.S. PATENT DOCUMENTS

| 4,556,943 | A | * | 12/1985 | Pauwels et al. | 701/115 |
| 4,556,955 | A | * | 12/1985 | Wright et al. | 700/4 |
| 4,558,416 | A | * | 12/1985 | Pauwels et al. | 701/114 |
| 4,601,051 | A | * | 7/1986 | Santurtun et al. | 378/118 |

(Continued)

FOREIGN PATENT DOCUMENTS

| DE | 198 13 389 A | 10/1998 |
| EP | 1102378 A | 5/2001 |
| EP | 1193576 A2 * | 4/2002 |

OTHER PUBLICATIONS

Adaptive control system for a field-oriented induction motor drive Nen, C.; Schmitt, W.; Karakaxis, K,; Manias, S.N.; Industrial Electronics, 1995. ISIE '95., Proceedings of the IEEE International Symposium on vol. 1, Jul. 10-14, 1995 pp. 309-314 vol. 1 Digital Object Identifier 10.1109/ISIE.1995.497014.*

(Continued)

*Primary Examiner*—Michael B. Holmes
(74) *Attorney, Agent, or Firm*—Cowan, Liebowitz & Latman, P.C.

(57) ABSTRACT

A control system for a load (10), the system comprising a first microprocessor (16) having an output to drive one side of a load (10), a second microprocessor (18) having an output to drive the other side of the load (10), the system being arranged so that when either microprocessor detects a fault in the control of the load (10) the load (10) is switched off.

20 Claims, 1 Drawing Sheet

U.S. PATENT DOCUMENTS

Figure 1:
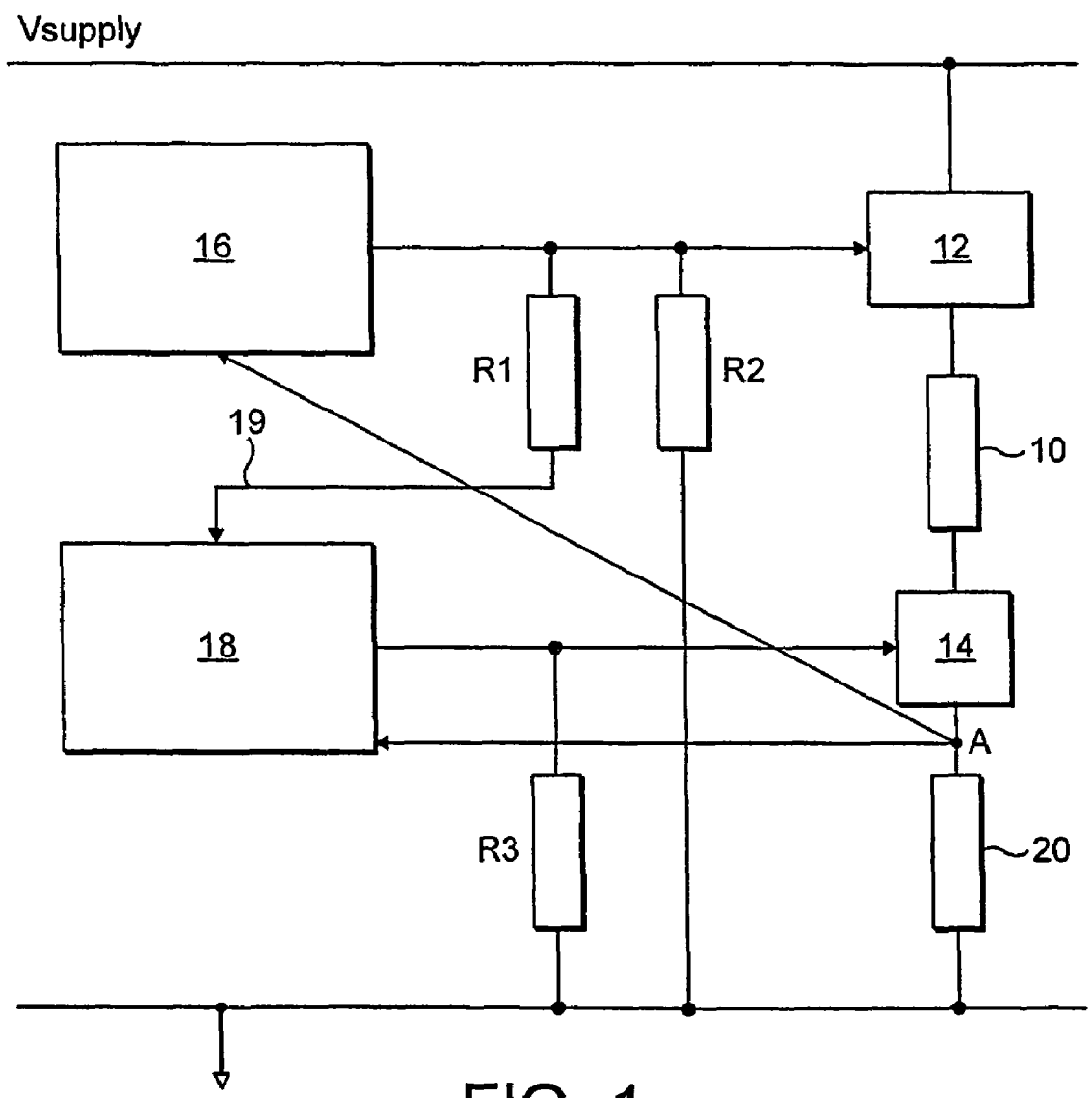

| | | | | |
|---|---|---|---|---|
| 4,709,341 | A | * | 11/1987 | Matsuda ..................... 714/815 |
| 4,850,027 | A | * | 7/1989 | Kimmel ..................... 382/303 |
| 4,965,879 | A | * | 10/1990 | Fischer, Jr. ..................... 701/3 |
| 5,020,135 | A | * | 5/1991 | Kasparian et al. ............. 455/76 |
| 5,203,387 | A | * | 4/1993 | Howlett et al. .............. 141/103 |
| 5,264,761 | A | * | 11/1993 | Johnson ..................... 315/291 |
| 5,345,390 | A | * | 9/1994 | Greenip et al. .............. 700/175 |
| 5,428,553 | A | * | 6/1995 | Chiba et al. .................. 700/293 |
| 5,673,192 | A | * | 9/1997 | Sato ........................... 701/36 |
| 5,786,996 | A | * | 7/1998 | Vitkus et al. ................... 700/82 |
| 5,984,504 | A | * | 11/1999 | Doyle et al. ................. 700/108 |
| 6,112,135 | A | * | 8/2000 | Peterson et al. ............. 700/293 |
| 6,201,997 | B1 | * | 3/2001 | Giers .......................... 700/79 |
| 6,231,133 | B1 | * | 5/2001 | Tsukamoto ............ 303/122.04 |
| 6,324,484 | B1 | * | 11/2001 | Gundersen .................. 702/115 |
| 6,357,289 | B1 | * | 3/2002 | Futawatari ................. 73/118.1 |
| 6,421,593 | B1 | * | 7/2002 | Kempen et al. ............... 701/48 |
| 6,529,796 | B1 | * | 3/2003 | Kroeger et al. .............. 700/202 |
| 6,564,173 | B1 | * | 5/2003 | Arntz et al. .................. 702/183 |
| 6,885,920 | B2 | * | 4/2005 | Yakes et al. ................... 701/22 |
| 6,904,348 | B2 | * | 6/2005 | Drummond et al. ........... 701/49 |
| 2002/0027757 | A1 | | 3/2002 | Sudou et al. |
| 2003/0144783 | A1 | * | 7/2003 | Drummond et al. ........... 701/49 |

OTHER PUBLICATIONS

Universal protection and control applied to a 3-breaker transfer scheme Day, T.; McCall, J.; Gomes, D.; Transmission and Distribution Conference, 1999 IEEE vol. 2, Apr. 11-16, 1999 pp. 454-459 vol. 2 Digital Object Identifier 10.1109/TDC.1999.756096.*

Fault tolerant parallel processing architectures for safety-critical applications Thompson, H.A.; Parallel Processing: Industrial and Scientific Applications, IEE Colloquium on May 24, 1991 pp. 1/1-1/8.*

Development of microprocessors based demand control system for industrial and commercial customer Ming Yuan Cho; Shih Wei Gau; Cha Win Huang; Industrial and Commercial Power Systems Technical Conference, 2001. Conference Record. Papers Presented at the 2001 Annual Meeting. 2001 IEEE May 15-16, 2001 pp. 1-6 Digital Object Identifier 10.1109/IC.*

Effects of system architecture on safety and reliability of multiple microprocessor control systems Milnor, R.C.; Washington, R.S.; Vehicular Technology Conference, 1984. 34th IEEE vol. 34, May 21-23, 1984 pp. 306-315.*

Automatic assembly for microelectronic components Zeungnam Bien; Sang-Rok Oh; Il-Hong Suh; Jae-Ok Kim; Young-Seok Oh; Control Systems Magazine, IEEE vol. 9, Issue 4, Jun. 1989 pp. 15-19 Digital Object Identifier 10.1109/37.24833.*

Innovation to reality—introducing state-of-the-art protection and monitoring to existing low-voltage switchgear Reber, S.; Pintar, M.; Eaves, C.; Cement Industry Technical Conference, 2004. IEEE-IAS/PCA Apr. 25-30, 2004 pp. 29-39.*

Engineering the CBTC interface with the NYCT R143 vehicle Schaefer, E.; Mortlock, E.; Railroad Conference, 2001. Proceedings of the 2001 IEEE/ASME Joint Apr. 17-19, 2001 pp. 17-28 Digital Object Identifier 10.1109/RRCON.2001.921747.*

Future research investment strategies Looft, D.J.; Decision and Control including the 16th Symposium on Adaptive Processes and A Special Symposium on Fuzzy Set Theory and Applications, 1977 IEEE Conference on vol. 16, Part 1, Dec. 1977 pp. 1-1 Digital Object Identifier 10.1109/CDC.1977.271534.*

Model reference adaptive control of a thermostatic chamber Ciccarella, G.; Marietti, P.; Industrial Electronics, IEEE Transactions on vol. 36, Issue 1, Feb. 1989 pp. 88-93 Digital Object Identifier 10.1109/41.20352.*

PCT International Search Report for parent application PCT/GB03/03102, dated Oct. 7, 2004.

* cited by examiner

CONTROL SYSTEM

This invention relates to a control system for a load such as a drive mechanism and in particular to a so-called "fail off" control system in which, when a fault is detected, the operation of the load is ceased or switched out.

Control systems generally include fault detection systems which control the operation of the control system when a fault is detected. There are three main types of control system with fault detection: "fail on", in which the mechanism associated with the control system is maintained in an "on" state if a fault is detected (commonly used in situations (e.g. aircraft) in which to turn the system off may result in fatal consequences); "fail off" in which the mechanism associated with the control system is put into an "off" state if a fault is detected (commonly used in situations (e.g. vehicle drive mechanisms) in which to leave the system on may result in fatal consequences); and "do nothing", in which the mechanism associated with the control system is maintained in its current state if a fault is detected and a log of a fault generated for later inspection and solution.

The invention will now be described, by way of example only, with reference to the accompanying drawing, in which:

FIG. 1 is a first embodiment of a drive control system.

A method and apparatus for controlling a load is described. In the following description, for the purposes of explanation, numerous specific details are set forth to provide a thorough understanding of the present invention. It will be apparent to a person skilled in the art that the present invention may be practised without these specific details. In other instance, well-known structures and devices are shown in block diagram form to avoid unnecessarily obscuring the present invention.

The needs identified above and other needs and objects that will become apparent from the following description are achieved in the present invention which comprises, in one aspect, a control system for a load, the system comprising a first microprocessor having an output to drive one side of a load and a second microprocessor having an output to drive the other side of the load. The system is arranged so that when either microprocessor detects a fault in the control of the load the load is switched off. In other aspects, the invention encompasses apparatus for carrying out the foregoing steps.

The control system to be described is part of the electronic system used in a vehicle such as a car but the method is applicable to other electronic systems, especially those that require fail-off systems.

FIG. 1 shows a first embodiment of a drive control system. A load 10 is driven by two drivers, a high side driver 12 and a low side driver 14. The operation of the driver 12 is controlled by a first microprocessor 16 while driver 14 is controlled by a second microprocessor 18. For safety reasons the second microprocessor 18 is provided to monitor the operation of the drive control system. The drivers 12, 14 may take any suitable form e.g. MOSFET switches or the like. The drivers 12, 14 may drive the load 10 by various means such as a Pulse Width Modulation (PWM) signal or the like.

Two microprocessors are provided to ensure a fail-safe operation of the drive control system. In normal operation, the main microprocessor 16 controls the high side driver 12 (the low side driver 14 normally being switched on) and monitors the operation of the load by monitoring the low side of the load 10 at point A. If it detects a fault it can switch off the load via driver 12.

Each microprocessor 16, 18 has programmed into it a set of rules by which the operation of the load is controlled. The set of rules of the second microprocessor 18 may be identical to the set of rules of the first microprocessor. Alternatively, the set of rules of the second microprocessor 18 may be coarser than or a subset of the set of rules of the first microprocessor.

In use, the second microprocessor 18 monitors the operation of the first microprocessor 16 and the operation of the load 10 to determine if the system is operating according to the set of rules of the second microprocessor. If either is not operating according to the set of rules of the second microprocessor, the microprocessor 18 switches out the load 10 by means of setting the low side driver 14 to open. Thus the load no longer has any effect on other systems.

In a preferred implementation of the invention, the second microprocessor monitors the outputs of the first microprocessor that controls driver 12 to monitor for faults with the main microprocessor 16. For this purpose, a connection 19 is provided. A resistor R1 is also provided to ensure that a fault in microprocessor 18 is unable to turn on driver 12 (ie R1 must be relatively high compared with R2 and the output resistance of the driver within microprocessor 16).

Each time a microprocessor is powered up, the microprocessor is reset which usually involves most, if not all, of the pins of the microprocessor being re-set as inputs. The programming of the microprocessor then resets the pins to their required state for proper operation. If the microprocessor incorrectly sets a pin to be an input rather than an output (or vice versa) clearly a fault with the microprocessor will exist.

In the arrangement of FIG. 1 resistor R2 operates to ensure that if the output pin of the main microprocessor 16 that is connected to the high side driver 12 switches to become an input pin, then the high side driver 12 is switched to open and the effect of the load switched out. Resistor R2 is connected between the ground rail and the output pin of the main microprocessor that is connected to the high side driver 12. R3 is connected between the ground rail and the output pin of the monitor microprocessor 18 that is connected to the low side driver 14 and ensures that driver 14 is switched off while the driver output pin of microprocessor 18 is high impedance.

The control system also includes a current sensor 20. This in itself may be a potential fault source since if it fails then the microprocessors are unable to detect this failure. This may be overcome by providing two current sensors in series. Alternatively, in a preferred embodiment of the invention, a back-up to the current sensor is provided by the monitor microprocessor 18 which calculates the current from the power supply voltage and the resistance of the load 10 by means of the equation $I=V/R$. This may also be achieved by monitoring the voltage at the high side driver 12 and the voltage at the low side driver 14, calculating the voltage drop across the load and, knowing the resistance of the load, calculating the load current.

The results of the calculation may then be compared with the output of the current sensor 20 and if the difference between the two meets predetermined criteria (e.g. is less than or equal to a pre-determined threshold), then the monitor microprocessor 18 detects a fault with the current sensor and either switches out the load as a result (for a fail off system) or logs the fault for subsequent consideration. In the latter case, the control system would then rely on the current calculation to monitor the current which may not be desirable, depending upon the type of load and/or the field of application of the load.

The control system shown is applicable to many areas where the control of a drive is required. The invention has particular application to a gear control system, for instance as used in a vehicle, but this is not intended to be limiting. In the field of vehicular gear control systems, the load 10 may be a gear box selector, a clutch selector, a valve in a pneumatics system etc.

In the foregoing specification, the invention has been described with reference to specific embodiments thereof. It will however be evident that various modifications and changes may be made thereto without departing from the broader spirit and scope of the invention. The description and drawings are, accordingly, to be regarded in an illustrative rather than a restrictive sense.

The invention claimed is:

1. A control system for a load, the system comprising a first microprocessor having an output to drive one side of a load, a second microprocessor having an output to drive the other side of the load and being arranged to monitor the operation of the load, the system being arranged so that when either microprocessor detects a fault in the control of the load the load is switched off.

2. A system according to claim 1 wherein both microprocessors monitor the current in the load.

3. A system according to claim 1 wherein a first resistor is connected between a driver output of the first microprocessor and an input of the second microprocessor, to allow the second microprocessor to monitor if the first microprocessor is attempting to turn on the load.

4. A system according to claim 3 wherein a second resistor with a value less than that of the first resistor, is connected between the output of the first microprocessor and a low voltage to ensure a driver controlling the load is off whenever the output of the first microprocessor is in a high resistance state.

5. A system according to claim 1 wherein at least one of the microprocessors is arranged to calculate the current of the load by measuring the voltage across it and, when the load current does not meet pre-determined criteria, to switch out the load.

6. A system according to claim 1 wherein the control system is a vehicular control system.

7. A system according to claim 1 wherein the load is a gear box selector, a clutch, selector or a valve.

8. A system according to claim 1 wherein the second microprocessor also monitors the operation of the first microprocessor, the system being arranged so that when the second microprocessor detects a fault in the operation of the first microprocessor and/or the operation of the load, the second microprocessor is arranged to switch out the load or halt the operation of the first microprocessor.

9. The control system of claim 1 wherein the second microprocessor also monitors the operation of the first microprocessor, the system being arranged so that when the second microproceosor detects a fault in the operation of the first microprocessor, the load is switched off.

10. The control system of claim 8 wherein the second microprocessor switches off the load by halting the operation of the first microprocessor.

11. The method of controlling a load comprising the steps of:
driving one side of the load with a first microprocessor,
driving the other side of the load with a second microprocessor,
monitoring the operation of the load, and
switching the load off when either microprocessor detects a fault in the control of the load.

12. A control method according to claim 11 wherein the second microprocessor further monitors the operation of the first microprocessor, and wherein when the second microprocessor detects a fault in the operation of the first microprocessor and/or the operation of the load, the second microprocessor switches out the load and/or halts the operation of the first microprocessor.

13. The control method of claim 11 wherein the second microprocessor is also arranged to detect a fault in the operation of the first microprocessor and to switch off the load in response to detecting a fault.

14. The method of claim 13 wherein the second microprocessor switches off the load by halting the operation of the first microprocessor.

15. A method according to claim 11 wherein both microprocessors monitor the current in the load.

16. A method according to claim 11 wherein the second microprocessor is arranged to monitor if the first microprocessor is attempting to turn the load on by means of a first resistor between the driver output of the first microprocessor and an input of the second microprocessor.

17. A method according to claim 16 wherein the first microprocessor is monitored by means of a second resistor with a value less than that of the first resistor, the second resistor being connected between the output of the first microprocessor and a low voltage to ensure the driver controlling the load is off whenever the output of the first microprocessor is in a high resistance state.

18. A method according to claim 11 wherein at least one of the microprocessors calculates the current of the load by measuring the voltage across it and, when the load current does not meet pre-determined criteria, switches off the load.

19. A method according to clam 11 wherein the control method is applied to a vehicular control system.

20. A method according to claim 11 wherein the load is one of the groups comprising a gear box selector, a clutch selector and a valve.

* * * * *